United States Patent
Howe et al.

(10) Patent No.: US 6,917,958 B1
(45) Date of Patent: Jul. 12, 2005

(54) METHOD AND APPARATUS FOR DYNAMIC DISTRIBUTION OF SYSTEM FILE AND SYSTEM REGISTRY CHANGES IN A DISTRIBUTED DATA PROCESSING SYSTEM

(75) Inventors: Brian Keith Howe, Round Rock, TX (US); Khoa Dang Huynh, Austin, TX (US); Chakkalamattam Jos Paul, Austin, TX (US); Stanley Alan Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,936

(22) Filed: Apr. 26, 1999

(51) Int. Cl.[7] .................................................. G06F 15/16
(52) U.S. Cl. ........................................ 709/203; 709/221
(58) Field of Search .............................. 709/203, 219, 709/215, 220, 221, 223, 222; 717/168–175; 714/38

(56) References Cited

U.S. PATENT DOCUMENTS

| | | | | | |
|---|---|---|---|---|---|
| 5,630,066 | A | * | 5/1997 | Gosling | 709/221 |
| 5,761,499 | A | * | 6/1998 | Sonderegger | 707/10 |
| 5,784,563 | A | * | 7/1998 | Marshall et al. | 709/221 |
| 6,061,448 | A | * | 5/2000 | Smith et al. | 380/282 |
| 6,108,779 | A | * | 8/2000 | Dean et al. | 713/2 |
| 6,182,131 | B1 | * | 1/2001 | Dean et al. | 709/222 |
| 6,209,031 | B1 | * | 3/2001 | Casey et al. | 709/222 |
| 6,243,745 | B1 | * | 6/2001 | Casey et al. | 709/220 |
| 6,262,726 | B1 | * | 7/2001 | Stedman et al. | 345/745 |
| 6,269,456 | B1 | * | 7/2001 | Hodges | 714/38 |
| 6,347,331 | B1 | * | 2/2002 | Dutcher et al. | 709/203 |
| 6,446,071 | B1 | * | 9/2002 | Callaway et al. | 707/10 |
| 6,487,718 | B1 | * | 11/2002 | Rodriguez et al. | 717/177 |
| 6,512,526 | B1 | * | 1/2003 | McGlothlin et al. | 345/762 |
| 6,836,794 | B1 | * | 12/2004 | Lucovsky et al. | 709/223 |

OTHER PUBLICATIONS

"Changing System Configuration for Shared Windows Applications" IBM Technical Bulletin, vol. 37, No. 2B, Feb. 1, 1994, pp. 505–506, 00188689372B505.*

* cited by examiner

Primary Examiner—Zarni Maung
Assistant Examiner—Kimberly Flynn
(74) Attorney, Agent, or Firm—Duke W. Yee; Jeffrey S. LaBaw; Francis Lammes

(57) ABSTRACT

The present invention provides a method for distributing system files and system registry changes dynamically. An "application package" consisting of system files and registry changes is added to a user. When the user logs on, the detection of a "package" is made if the package is not already installed on the client machine, a batch file is used to copy the files and make the registry changes to the local machine. A "key" is then set on the machine indicating that the files/registry entries are installed.

27 Claims, 7 Drawing Sheets

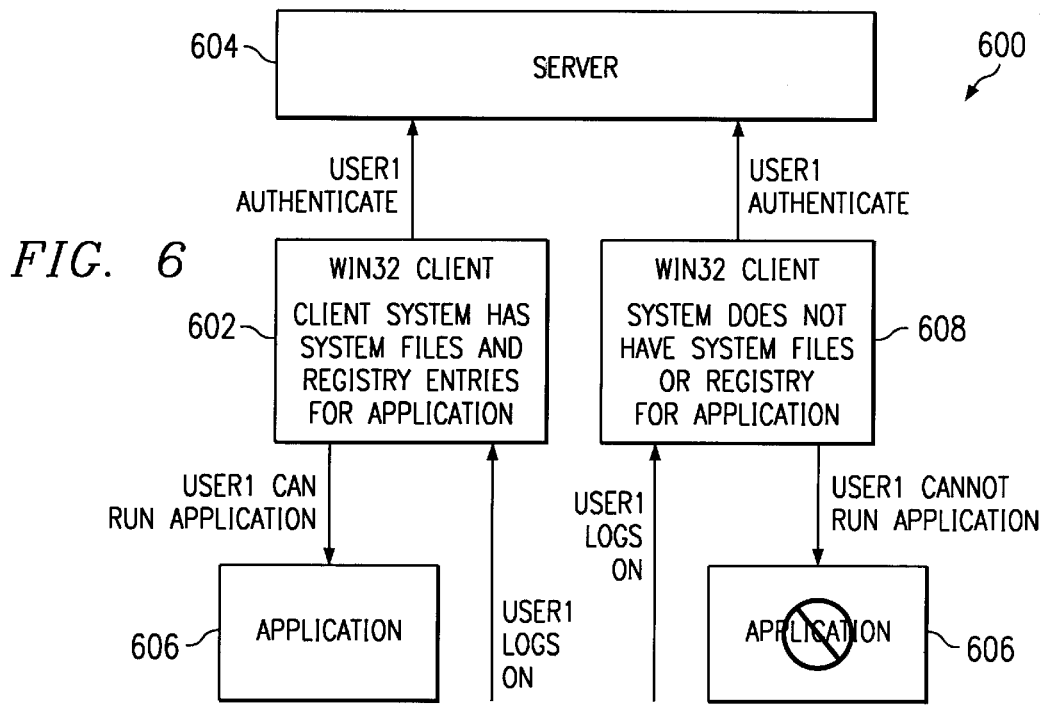
FIG. 6
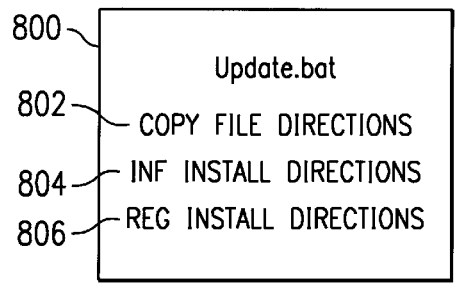
FIG. 8
FIG. 9
REGEDIT4
[HKEY_LOCAL_MACHINE\SOFTWARE\IBM]
"@"="Default Value"
[HKEY_LOCAL_MACHINE\SOFTWARE\IBM]
"String Value"="String Data"
[HKEY_LOCAL_MACHINE\SOFTWARE\IBM]
"Binary Value"=hex:01,02,AA,FF,53
[HKEY_LOCAL_MACHINE\SOFTWARE\IBM\New Key]
    "DWORD Value"=dword:04030201

```
[Version]
Signature="$CHICAGO$"
[DefaultInstall]
AddReg=AddReg
[AddReg]
HKLM,"Software\IBM","",0,"Default Value"
HKLM,"Software\IBM","String Value",0,"String Data"
HKLM,"Software\IBM","Binary Value",196609,01,02,AA,FF,53
HKLM,"Software\IBM\New Key","DWORD Value",65537,04,03,02,01
```
*FIG. 10*
*FIG. 11*
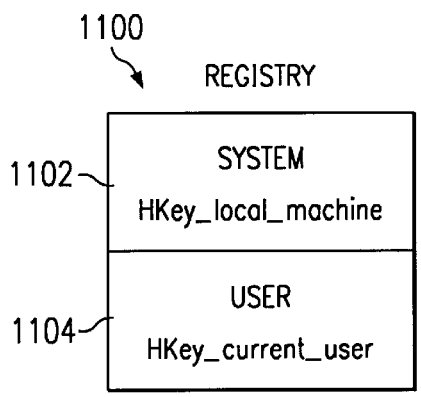
*FIG. 12*
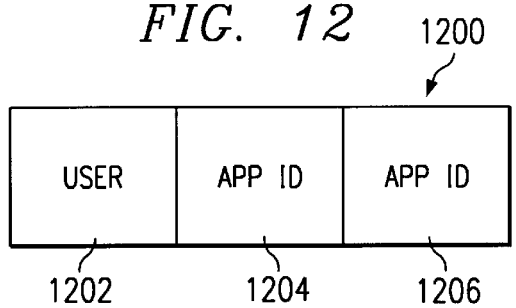
*FIG. 13*
HKEY_LOCAL_MACHINE\Software\IBM\DynamicApps\InstalledApps
"WidgetApp"=1
"GadgetApp"=1

METHOD AND APPARATUS FOR DYNAMIC DISTRIBUTION OF SYSTEM FILE AND SYSTEM REGISTRY CHANGES IN A DISTRIBUTED DATA PROCESSING SYSTEM

CROSS REFERENCE TO RELATED APPLICATIONS

The present invention is related to applications entitled METHOD AND APPARATUS TO UPDATE A WINDOWS REGISTRY FROM A HETEROGENEOUS SERVER, Ser. No. 09/299,939, METHOD AND SYSTEM FOR MANAGING WINDOWS DESKTOPS IN A HETEROGENEOUS SERVER ENVIRONMENT, Ser. No. 09/299,937, METHOD AND SYSTEM FOR USER-SPECIFIC MANAGEMENT OF APPLICATIONS IN A HETEROGENEOUS SERVER ENVIRONMENT, Ser. No. 09/299,951, METHOD AND SYSTEM FOR MANAGING WINDOWS APPLICATIONS IN A HETEROGENEOUS SERVER ENVIRONMENT, Ser. No. 09/299,950, and METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT, Ser. No. 09/299,952, all of which are filed even date hereof, assigned to the same assignee, and incorporated herein by reference.

BACKGROUND OF THE INVENTION

1. Technical Field

The present invention relates generally to an improved distributed data processing system and in particular to a method and apparatus for providing users access to applications at different clients within the distributed data processing system.

2. Description of Related Art

In distributed data processing systems, the client-server model is a well-known environment. In this model, the user of a computer utilizes a "client" system. The client system runs any of a number of computer operating systems to manage the basic functions that users execute, such as accessing files, executing programs, and system administration, as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include, for example, Novell NetWare, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

The client-server model continues to evolve to meet the need for distributed resources. As personal computers have gained more functionality and reliability, end-users have improved their productivity through the use of a variety of distributed computing resources. While some enterprise data and legacy applications continue to be placed on reliable mainframe platforms, the need for distributed enterprise access to large numbers of applications and large amounts of data continues to grow.

Operating systems and computing hardware platforms have proliferated, and each combination of computer hardware and software addresses the need for a variety of price, performance, legacy compatibility, and features. Traditional PCs, such as desktop and laptop PCs, are designed to offer highly sophisticated end-user environments. The installation of workgroup computing software and complete application suites requires a computer with significant local storage and local networking capabilities. Network computers (NCs), on the other hand, offer a different type of versatility as they may provide limited access to Java™ and Windows™ based applications. NCs are typically implemented with only a general purpose processor, a system memory, and a communications port. Therefore, NCs typically rely upon network access to provide dynamic, non-volatile data storage capability.

Each of the various implementations of the client-server model has advantages and disadvantages. Networked PCs have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PCs retain some semblance of a standard configuration. Many operating systems provide various levels of system administration capabilities for accomplishing such administrative tasks. However, as users become more technically sophisticated through everyday use of various computing devices, users demand more options in their access to data and to computing resources. For example, people who travel extensively or work at various locations may rely on the ability to have access to a common set of applications wherever they are located. Enormous costs and amounts of time may be spent in accommodating user preferences while pursuing corporate directives for the use of standard configurations.

Industry standards have been developed for both critical and common functions to aid in the implementation of a system containing different types of client systems accessing different types of server systems. The use of these standards on the client and server afford users the opportunity to carry out functions in a consistent manner on a variety of common client and server operating systems, thereby reducing administrative costs. For example, one of the activities that has been standardized is the "authentication" of users. Authentication refers to the process in which a user is validated as being able to complete a logon and/or access a system. Standard protocols have been defined within the X/Open Server Message Block (SMB) specification and the Open Systems Foundation (OSF) Distributed Computing Environment (DCE) specification. While many products and operating systems have been developed that utilize standard protocols, not all products have used the standards. Hence, enterprises confront the difficult challenge of cost-effectively maintaining system administrative knowledge of enterprise-wide computer configurations while allowing some amount of user-specific configuration flexibility within a variety of operating systems that use non-standard protocols and data file formats.

With respect to the use of non-standard protocols, Windows 95, Windows 98 and Windows NT are such an example. With these operating systems, updates to the operating system including configuration changes, operating system settings, device drivers, and installation of applications all use the registry to store and retrieve information from values within the registry. The registry contains information that is partitioned into two sections. General system information is found in one section and user specific information is found in the other section of the registry. Updates to the registries in the operating systems, however, only can be made using Microsoft Windows application program interfaces (APIs). As a result, distributed data processing systems in which non-Windows servers are present, these servers are unable to initiate and incorporate changes to the registry.

Thus, it would be advantageous to have an improved method and apparatus for providing user access to applications at different clients within the distributed data processing system.

SUMMARY OF THE INVENTION

The present invention provides a method for distributing system files and system registry changes dynamically. An "application package" consisting of system files and registry changes is added to a user. When the user logs on, the detection of a "package" is made. If the package is not already installed on the client machine, a batch file is used to copy the files and make the registry changes to the local machine. A "key" is then set on the machine indicating that the files/registry entries are installed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a block diagram illustrating problems currently associated with the user moving from client to client depicted in accordance with a preferred embodiment of the present invention;

FIG. 8 is a diagram of an update batch file depicted in accordance with a preferred embodiment of the present invention;

FIG. 9 is an example of a REG file depicted in accordance with a preferred embodiment of the present invention;

FIG. 10 is an example .INF file depicted in accordance with a preferred embodiment of the present invention;

FIG. 11 is a registry depicted in accordance with a preferred embodiment of the present invention;

FIG. 12 is a diagram of a user store depicted in accordance with a preferred embodiment of the present invention;

FIG. 13 is a diagram of a registry key entry on the local client machine signaling the application is installed depicted in accordance with a preferred embodiment of the present invention;

DETAILED DESCRIPTION OF THE PREFERRED EMBODIMENT

Figure 1:
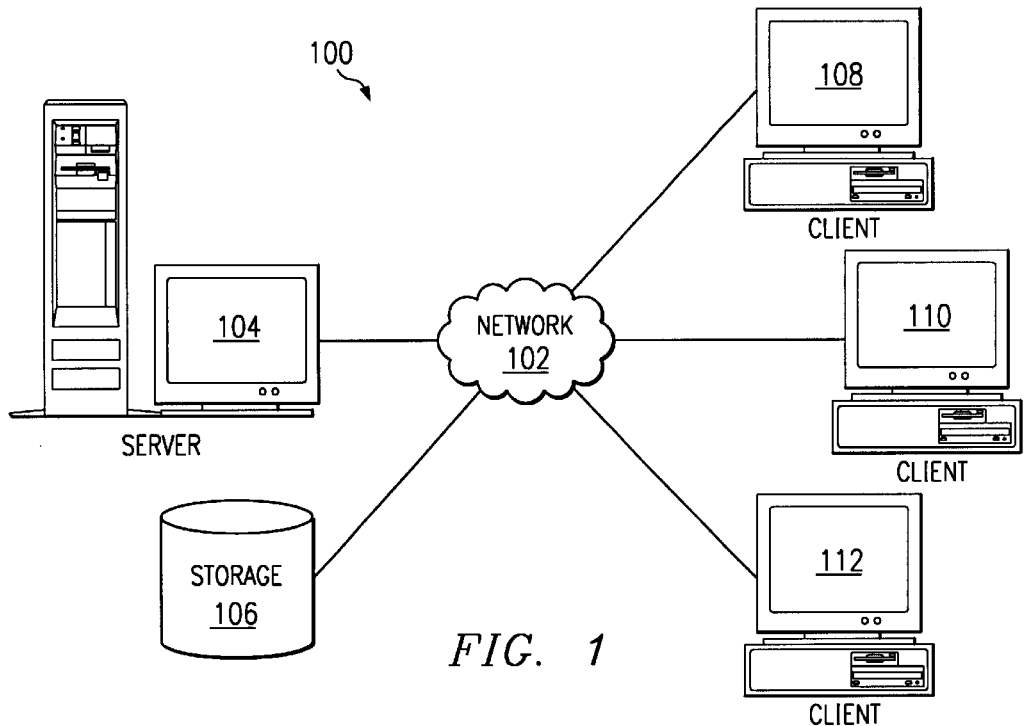
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A client running the same operating system as the server is said to be "native," whereas a client running a different operating system from the server is said to be "non-native." Given a Microsoft Windows NT client, examples of non-native servers may include, without limitation, IBM OS/2 Warp Server, IBM LAN Server, other types of Server Message Block (SMB) servers, as well as operating systems that run Open Systems Foundation (OSF) Distributed Computing Environment (DCE) software. An example of the latter is a DCE Cell running Distributed File System (DFS). The use of a term "Windows" in this description refers to a Window based system, such as Windows 95, Windows 98, and Windows NT, which are available form Microsoft Corporation.

The term "homogenous" is commonly used to describe an environment in which the operating system of the client and the operating system of the server that is accessed by the client are the same. The term "heterogeneous" is commonly used to describe an environment in which the client operating system and the server operating system are different.

Figure 2:
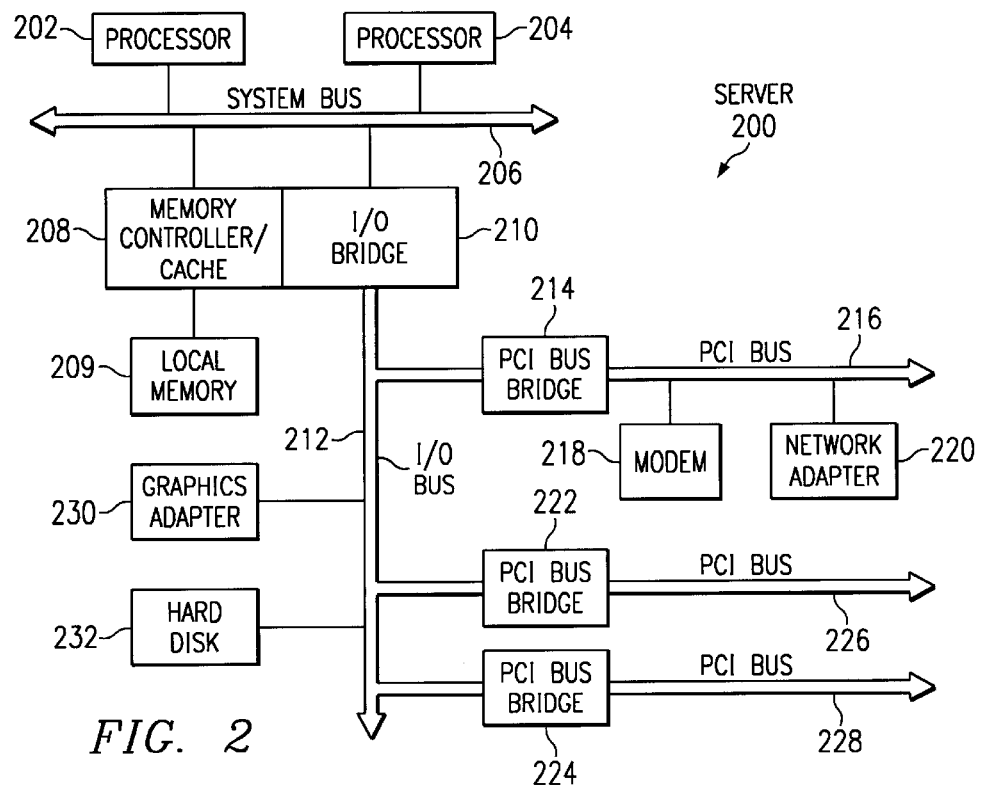
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors.

Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
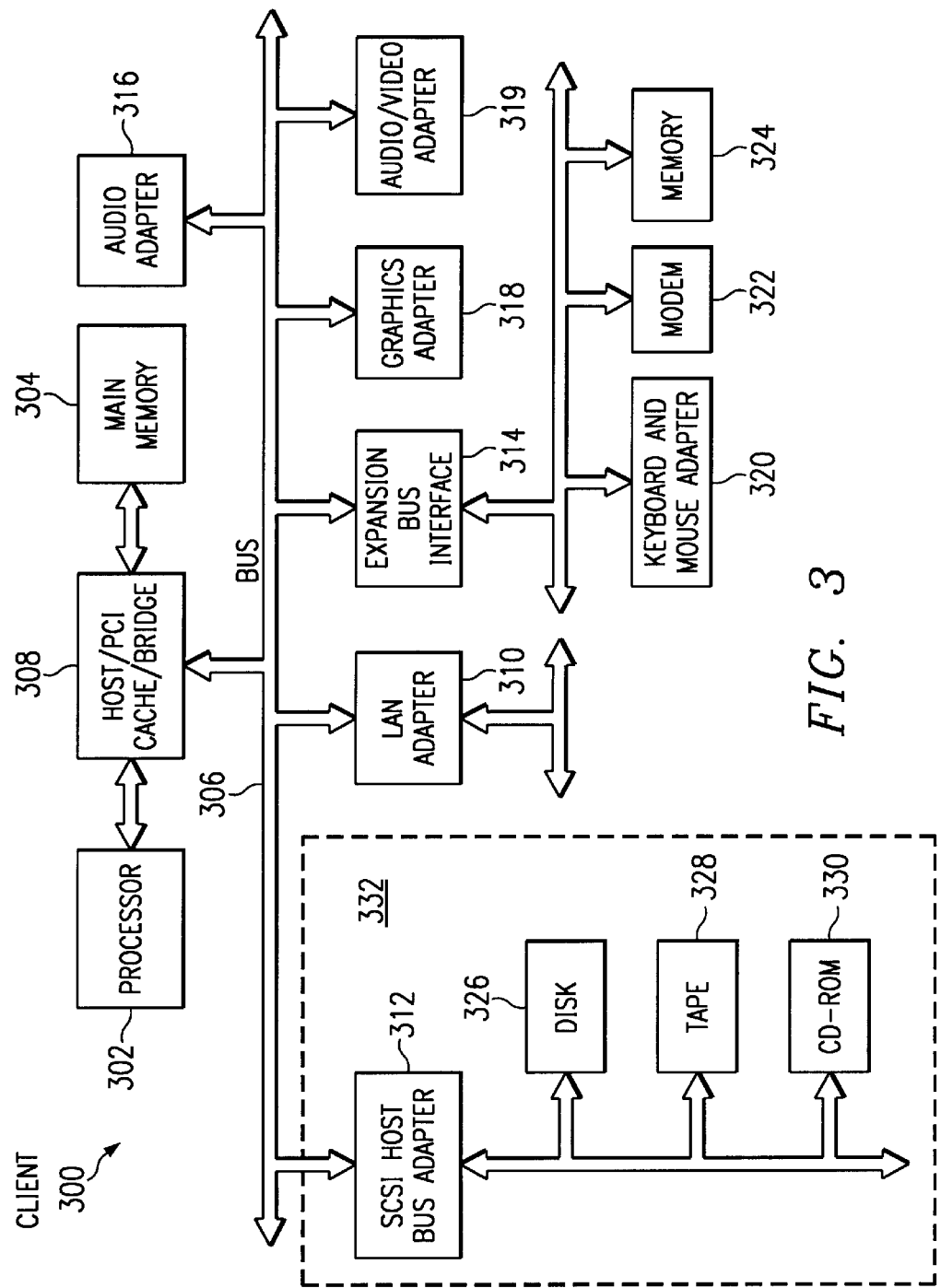
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instruction for allowing changes to system files and entries in a registry to be made at clients in a dynamic manner. The present invention provides a mechanism in which these types of changes may be designated at a central storage location, such as a server, and then dynamically made to clients systems in the disturbed data processing system as needed. In particular, these changes are typically made when a user logs on to the client. Not all clients will necessarily have the needed system files or registry information needed to run an application. The need to update a client is made on a per user basis, which allows necessary system files and system registry changes to be made as the user moves from client to client in a distributed data processing system.

When an application package is created, the package may be designated as dynamic. This designation determines whether the server will allow for file and registry changes to be distributed to a user who is at a client that does not currently support the application even though the user is allowed access to the application.

In the depicted examples, the system files are those needed for a user to access and execute a particular application. For example, these files may include executable files and dynamic link library files. A set of system registry settings for an application are placed in a format, such as a REG or .INF file format, for distribution to a client. To allow for a heterogeneous server to distribute the needed changes to provide access to an application, these changes may be initiated through instructions that make calls, such as Windows API calls, in a manner recognized by the client.

Further, the registry settings may be placed in other formats supported by the client system, which in this example is a Windows based system. These registry settings include information needed to run the application on the client in a manner set up for a particular user. A registry is a central hierarchical database in Windows 95, Windows 98 and Windows NT used to store information necessary to configure the system for one or more users, applications, and hardware devices. The registry contains information that Windows 95, Windows 98 and Windows NT continually reference during operation, such as profiles for each user, the applications installed on the computer and the types of documents each can create, property sheet settings for folders and application icons, what hardware exists on the system, and which ports are being used. Registry files (.REG) contain information that may be used to update the registry on a client. Initialization files (.INI) contain user preferences and startup information about an application. Information files (.INF) are files containing set up information for applications. INF files can be used to make registry changes and INI file changes.

The commands used to install the appropriate files for the application are stored in an accessible location on the server. These commands may be, for example, part of a file, (e.g., a batch file), that is associated with the user and always available on the server. When the user has a dynamic application or other system change, such as the addition of a new application, the appropriate file is updated to reflect the availability for the user. This file may be, for example, a user profile or other data structure, such as update lists 706, 712, and 720 in user store 704 in FIG. 7.

When a user goes to a workstation in the network and authenticates at the server, the appropriate file is checked to determine which applications have been made available to the user. This information is then compared to the persistent system registry entries on the workstation to determine if the package has already been distributed and the appropriate updates made on the workstation. If the package has not been installed previously on the system, the changes defined in the file are made. These changes include the copying down of the necessary system files from the server, the updates to the system registry, and addition of a key to indicate that the package has now been installed on the workstation.

The result is that the user can now execute the necessary application or utilize the necessary system function. When the user returns to this workstation, the updates will not be required again since the key will indicate the change has already been made on the system.

Figure 4:
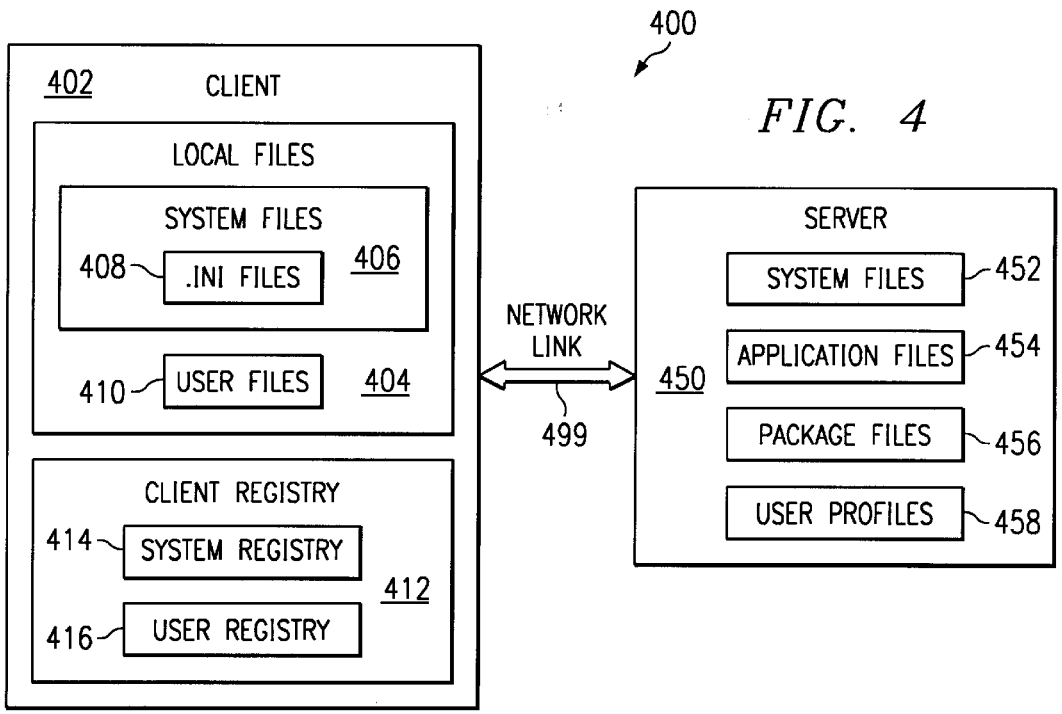
FIG. 4 is a block diagram depicting an example of the storage of pertinent information within a client server environment that may implement in the present invention.

With reference now to FIG. 4, a block diagram depicts an example of the storage of pertinent information within a client server environment that may be implemented in the present invention. System 400 contains client 402 that communicates with server 450 across network link 499. Client 402 contains local files 404 consisting of such files as application files, data files, device drivers, operating system files, or other types of files. Local files 404 may include specific categories of files such as user files 410 and system files 406. User file 410 may be those application and data files that customize or configure client 402 in a personal manner for a specific user. System files 406 may include operating system and application files available for use to any user of client 402. System files 406 may include .INI files 408. In the DOS and Windows operating systems, the ".INI" file extension identifies an initialization file that contains user preferences and start up information about an application program.

Client 402 also contains client registry 412. The registry is a central hierarchical database in the Windows 9× and Windows NT operating systems. Windows 9×refers to Windows 95, Windows 98, and its successor operating systems. The registry stores information necessary to configure a computer system for one or more users, applications, or hardware devices. The registry contains information that Windows 9X and Windows NT continually reference during operation, such as profiles for each user, the applications installed on the computer, the types of documents that each application may create, information about folders and icons, the type of hardware on the computer system, and the configuration of the input/output boards. Entries and registry 412 may be categorized as system-related entries and user-related entries shown as system registry 414 and user registry 416.

Server 450 contains sets of files that may be sent from server 450 to configure client 402 upon startup of client computer. System file 452 may include system image files or other operating system files that provide boot up capability of the client computer. Application file 454 contains application programs that may be executed on the client computer for various data processing capabilities. Package files 456 are files that enable a system administrator to manage applications from the server to decide whether specific users can access specific applications. These package files are not distributed to the client, they are just used at the server. Application packages are a collection of system files, system registry entries, user files, shortcuts, and user registry entries. Application packages may be as small as a single file. These packages are stored at a server so that they can be accessed and distributed to client systems. Application packages may contain one or more applications. User profiles 458 contains other information or files that may be sent from the server to a client to customize a client computer for a specific user.

Figure 5:
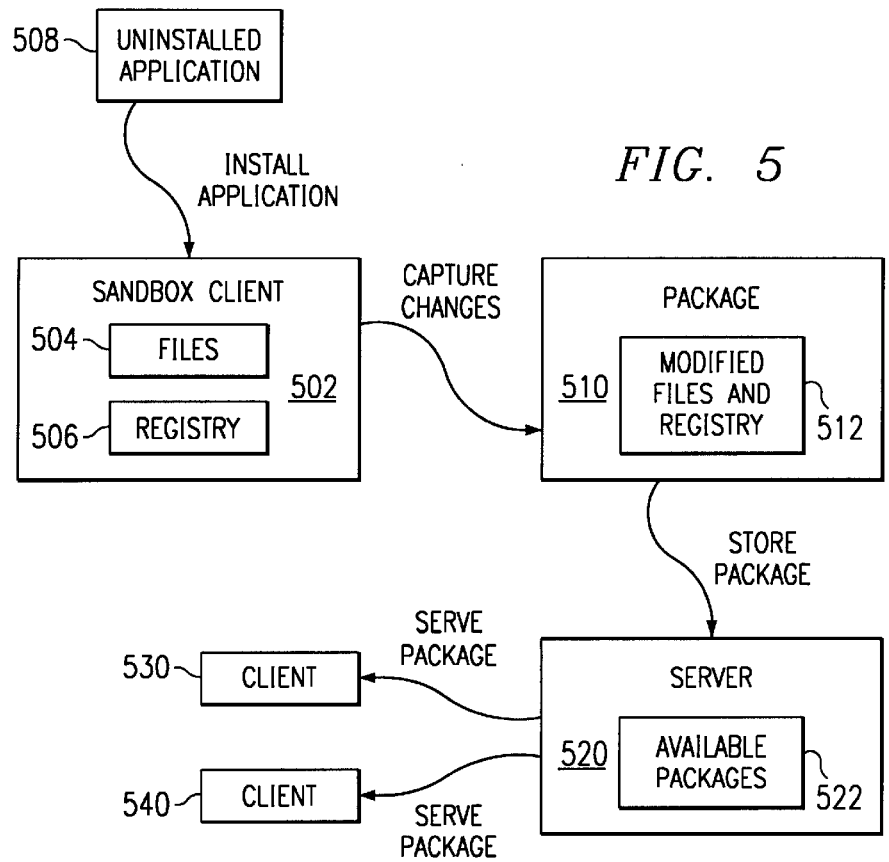
FIG. 5 is a block diagram depicting the overall process for capturing configuration information for customizing a client environment from a heterogeneous server.

With reference now to FIG. 5, a block diagram depicts the overall process for capturing configuration information for customizing a client environment from a heterogeneous server. Sandbox client 502 contains files 504 and registry 506. Using the metaphor of a sandbox as a container within which a structure may be molded and shaped in a customized manner, sandbox client 502 is a client within a specific domain with an unrestricted desktop and the capability for capturing modifications to the client and storing those modifications on the server.

At some point, a system administrator desires to provide access to an application for a user or class of users. The system administrator installs uninstalled application 508 onto sandbox client 502. During the installation process, files 504 and registry 506 on sandbox client 502 will be modified. These modifications are captured as modified files and registry 512 within package 510. Package 510 contains information necessary for recreating the environment within the sandbox client with the addition of the newly installed application. The package is stored as one of the available packages 522 on server 520. As part of the user account administration procedures, system administrator provides access to a package for a user as part of the users expected run time environment. One or more applications may be present in a package. If the user logs on to client 530, one of the available packages may be served to client 530 during the users logon process. The package will provide the user with a familiar environment so that a user may be immediately productive on client 530 even if the user has never used that particular machine before. The user may roam within the domain, and the system will serve the proper package to the user so that the user always has access to a familiar run time environment. If the user logs on to client 540, then the same environment may be familiar to using on client 530 will follow the user to a new machine.

With reference now to FIG. 6, a block diagram illustrating problems currently associated with the user moving from client to client is depicted in accordance with a preferred embodiment of the present invention. In this example, user, such as user one, may logon to different clients in a distributed data processing system 600. When the user logs on to client 602, user is able to run application 606 because client 602 already contains the files and registry entries for application 606.

User logs on to distributed data processing system 600 through server 604. Server 604 is used to authenticate the user. Once the user is authenticated, then the user is able to use application 606. At a subsequent time, the user will logoff of client 602 and travel to another location or station and logon to client 608. In this instance, the user will logon through server 604, which will authenticate the user on distributed data processing system 600. In this instance, client 608 does not have the system files or the registry for application 606. As a result, the user is unable to run application 606.

Figure 7:
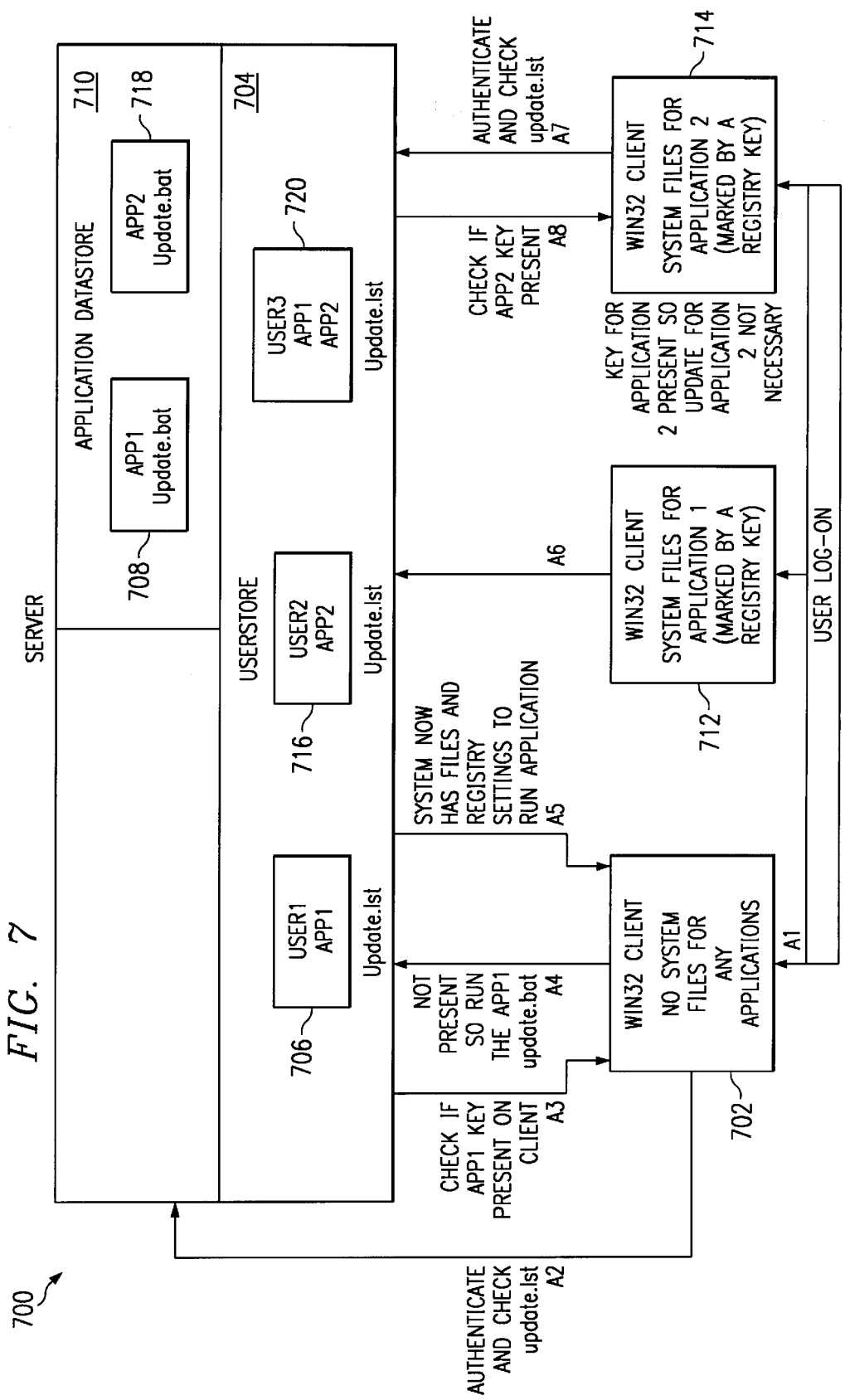
FIG. 7 is a diagram illustrating dynamic distribution of system files and system registry changes depicted in accordance with a preferred embodiment of the present invention.

With reference now to FIG. 7, a diagram illustrating dynamic distribution of system files and system registry changes is depicted in accordance with a preferred embodiment of the present invention.

Distributed data processing system 700 includes a client 702 on which a user may log on. In this example, the user will perform a log on at client 702 (step A1). In response, client 702 will authenticate and check the update list on server 704 (step A2). This check is to see if a user store is present for the user. In the depicted example, update list 706 has been designated for the user logged onto client 702. In this example, user store 704 is associated with user 1 and provides a change in access for user 1. In this example, the user is now able to access application APP1. In response, server 704 will check to see if a key or token or other indication is present on the client to indicate the presence of an installation of application APP1 (step A3). In the depicted examples, the key is a registry entry in the registry on the client. If the key is not present on client 702, this is an indication that no system files are present for the application. As a result, such an indication is returned to server 704 (step A4). This causes APP1 update.bat 708 to be executed from application datastore 710 in server 704. This file, in this example, is a batch file that is used to copy the appropriate files and to make the appropriate registry changes to client 702 to allow the user to use application APP1 at client 702 (step A5).

As a result, client 702 will now have the files and registry settings necessary to run application APP1. If the same user, user one, logs on to client 712, the authentication of this client will result in an indication that the system files and registry data is present for application APP1. This is marked by a registry key in accordance with a preferred embodiment of the present invention.

If a second user, user 2, logs onto client 714, an authentication and check of the update list is made for the user on client 714 (step A7). In this example, user 2 is associated with update list 716, which indicated in the application APP2 has now been added to the applications accessible by user 2. As a result, a check is made to see if a key for application APP2 is present in the registry file (step A8). In this example, client 714 contains the registry key for application APP2. In this case, the system files and registry information is present to run application APP2 in client 714. As a result, no batch file needs to be executed. If, however, the application APP2 was not present on client 714, then APP update.bat 718 would be executed to provide the necessary files and registry information for client 714.

Also shown on server 704 is a user store 720 for another user in which the user has been granted access to applications APP1 and APP2. The lists, in these examples, are preserved at the server. This is because the server does not know when the user will roam to a new machine. These user stores may be checked by scripts or other code that are run when the user logs on to perform the necessary checks for the key on the client and to run the necessary batch file in response to an absence of a key in a registry on the client for one or more applications in which a user has been granted access.

With reference now to FIG. 8, a diagram of an update batch file is depicted in accordance with a preferred embodiment of the present invention. In this example, batch file 800 includes a number of different directions, in particular, copy file directions 802, INF install directives 804, and registry install directives 806 are present in batch file 800. Batch file 800 is an example of a batch file from FIG. 7, such as APP1 update.bat 708 or APP2 update.bat 718 in application datastore 710.

With reference now to FIG. 9, an example of a REG file is depicted in accordance with a preferred embodiment of the present invention. In FIG. 10, and example .INF file is depicted in accordance with a preferred embodiment of the present invention. Both of these files contain system registry information that is to be placed into a registry on a client through API calls. In FIG. 9, the examples are used to change or update the registry on a client.

The statements have the following general format in Windows 95 and 98: "HKCU,'Software\IBM', 'ValueName',0,'Data'" where "HKLM" is the local machine registry key. This statement is the format for a Windows NT .INF file change. "Software\IBM" indicates the key to add/change. "ValueName" is the key value to add/change. "0" is the string type. "Data" indicates key data to add/change. Another general format is: "'C:\test.ini','new section',,'key1=val1'". This statement is the format for a Windows 95, Windows 98 and Windows NT .INI file change. This format is used to make updates to values in the registry. "C:\test.ini" is the INI file to create/change. "new section" indicates the INI section to create/change. "key1= val1" is the key, value pair to create/change. In Windows NT, a similar command is used as follows: "rundll32.exe setupapi.dll,InstallHinfSection DefaultInstall 128 filename.inf". "rundll32.exe" is the executable run. "setupapi.dll" indicates the dll to use. "InstallHinfSection" indicates the parameter to the setupx.dll. "DefaultInstall" indicates section in the filename.inf file to install. "128" is the reboot parameter (128 is do not reboot). "filename.inf" indicates the name of the INF file to install. Next, commands used to install registry files take the following format: "regedit.exe /s filename.reg" "regedit.exe" is the executable run. "/s" indicates silent mode (do not display message boxes). "filename.inf" indicates the name of the REG file to install. Windows NT uses INF files for both registry and INI changes. Windows 95/98 use INF files for INI changes and REG files for registry changes.

These calls are placed in batch files. A call used to write changes from a registry file and may be as follows: regedit.exe /s filename.reg. "regedit.exe" is the executable to be run. "/s" indicates that a silent mode is to be used in which a display message box is not shown. "filename.reg" is the name of the registry file that is to be installed. In writing information file, the following command is used for Windows 95 and Windows 98: "rundll.exe setupx.dll, InstallHinfSection DefaultInstall 128 filename.inf" or "rundll32.exe setupapi.dll,InstallHinfSection DefaultInstall 128 filename.inf". In Windows 98/98 the command to install Windows 95/98 INF file are as follows: "rundll.exe" is the executable run. "setupx.dll" is the dll to use. "InstallHinfSection" indicates the parameter to the setupx.dll. "DefaultInstall" indicates the section in the filename.inf to install. "128" indicates the reboot parameter (128 is do not reboot). "filename.inf" is the name of the file to install. In Windows NT the command to install a Windows NT INF is as follows: "rundll32.exe setupapi.dll,InstallHinfSection DefaultInstall 128 filename.inf". "rundll32.exe" is the executable run. "setupapi.dll" indicates the dll to use. "InstallHinfSection" indicates the parameter to the setupx.dll. "DefaultInstall" indicates the section in the filename.inf file to install. "128" indicates the reboot parameter (128 is do not reboot). "filename.inf" is the name of the INF file to install.

Turning next to FIG. 11, a registry is depicted in accordance with a preferred embodiment of the present invention. Registry 1100 includes a system portion 1102 and a user portion 1104. System portion 1102 contains information that is need for the application to run on the particular client while user portion 1104 contains information need to tailor the application to the user.

With reference now to FIG. 12, a diagram of a user store is depicted in accordance with a preferred embodiment of the present invention. User store 1200 is an example of a user store such as user store 706 in FIG. 7. User store 1200 includes a user identification 1202 along with application IDs 1204 and 1206. In this example, user store 1200 has two applications associated with the user. Of course, other numbers of applications IDs may be associated with the user depending on the access that is to be permitted.

Turning next to FIG. 13, a diagram of a registry key entry is depicted in accordance with a preferred embodiment of the present invention. This registry key entry is made in the registry branch HKEY_LOCAL_MACHINE under the registry key Software\IBM\DynamicApps\InsalledApps. In these examples, the value of the entries are set equal to one to indicate that the application is installed. If the application is not installed, the entry is set equal to zero in these examples or is not present. These entries are made in response to the dynamic installation of an application on a client machine.

Figure 14:
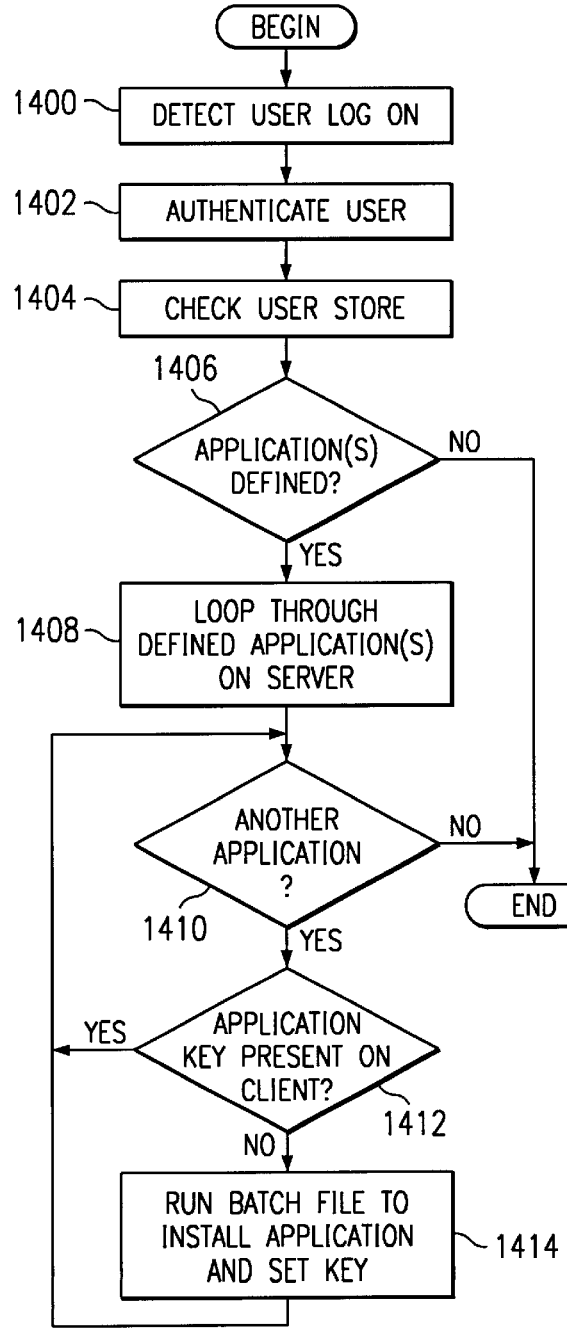
FIG. 14 is a flowchart of a process for enabling a user to run applications on a client depicted in accordance with a preferred embodiment of the present invention.

With reference now to FIG. 14, flowchart of a process for enabling a user to run applications on a client is depicted in accordance with a preferred embodiment of the present invention. The process begins by detecting a user logon to the distributed data processing system (step 1400). Thereafter, the user is authenticated (step 1402). This step is typically performed by a server that is configured for authenticating users through receiving a password and ID. Often times, the server is identified by the user through a domain name. An update list is checked to see if an update list is present for the particular user (step 1404). Thereafter, a determination is made as to whether the application that the user has access to is present on the client (step 1406). If the application is not present, the process terminates. Otherwise, the process loops through the defined application(s) on the server (step 1408). A determination is then made as to whether another application is present for processing (step 1410). If no additional applications are present, the process terminates. Otherwise, a determination is then made as to whether an application key is present for the application on the client (step 1412). If an application key is present, the process returns to step 1410 as described above. If an application key is not present, a batch file is run to install the application and set a key for the application on the client (step 1414) with the process then returning to step 1410. In this example, a batch file containing the appropriate commands to copy and execute installation of an application is located within the batch file. Of course, other mechanisms may be employed depending on the particular implementation. For example, a script or an executable file may be run in this instance.

Figure 15:
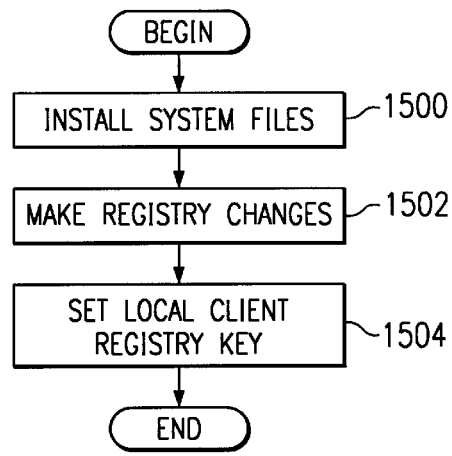
FIG. 15 is a flowchart of a process used to dynamically install an application on a client machine depicted in accordance with a preferred embodiment of the present invention.

Turning next to FIG. 15, a flowchart of a process used to dynamically install an application on a client machine is depicted in accordance with a preferred embodiment of the present invention. FIG. 15 is a more detailed description of step 1414 in FIG. 14. The process begins by installing system files (step 1500). This step involves copying various system files to the client to the server. Thereafter, registry changes are made to the client (step 1502). These registry changes are made to the system registry portion of the registry on the client at which the user is located. These changes may be made through API calls and through INF (information setup) files or registry files. Thereafter, the registry key is set to indicate that the application is present and available on the client (step 1504) with the process terminating thereafter. This step may be part of the changes made in step 1502.

Thus, the present invention provides an improved mechanism for allowing dynamic installation of system files and system registry changes for users in a server managed environment in which users are able to roam among different clients within a distributed data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples illustrated updates made to a registry, the processes of the present invention also may be applied to other data structures used to store information necessary to configure the system for one or more users, applications, and hardware devices. Further, the processes of the present invention may be applied to providing updated user information to a client when that information is absent from the client. For example, other user specific files also may be sent to the client in addition to or in place of changes to the registry. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a server data processing system for distributing applications, the method comprising the data processing system implemented steps of:
   detecting a user at a client data processing system;
   identifying an application assigned to the user;
   determining whether the application is setup on the client data processing system in response to identifying the application assigned to the user;
   responsive to an absence of the application on the client data processing system, sending files for the application to the client data processing system; and
   setting up the application on the client data processing system using the files wherein the step of setting up the application on the client data processing system includes updating a registry in the client data processing system to include information required to run the application on the client data processing system.

2. The method of claim 1, wherein the step of setting up the application on the client data processing system further includes including an indication in the registry that the application is setup to run on the client data processing system.

3. The method of claim 1, wherein the registry includes system specific information that is specific to the client data processing system.

4. The method of claim 1, wherein the user is detected at the data processing system when the user logs onto to the network.

5. The method of claim 1, wherein the client data processing system is a workstation.

6. The method of claim 1, wherein the client data processing system is a personal digital assistant.

7. The method of claim 1, wherein the step of setting up the application is performed by running a batch file located on the server data processing system.

8. The method of claim of claim 1, wherein the client data processing system includes a registry and wherein the step of determining whether the application is set up on the client data processing system comprises determining whether a key is present in the registry indicating that the client data processing system is setup to run the application.

9. A method in a data processing system for distributing applications, the method comprising the data processing system implemented step of:
   detecting a user at a client;
   identifying a plurality of applications assigned to the user;
   determining whether the plurality of applications are installed on the client in response to identifying the application assigned to the user, wherein the client includes a data structure used by the plurality of applications to run on the client; and
   responsive to an absence of a determination that an application within the plurality of applications is accessible by the user on the client, sending files and updating the data structure on the client to enable the user to access the application on the client wherein the data structure is a registry of the client, and wherein updating the data structure includes adding information required to run the application on the client.

10. The method of claim 9, wherein the step of sending files and updating the data structure is performed by running a batch file located on a server.

11. A data processing system for distributing applications, the data processing system comprising:
    detecting means for detecting a user at a client data processing system;
    identifying means for identifying an application assigned to the user;
    determining means for determining whether the application is setup on the client data processing system in response to identifying the application assigned to the user;
    sending means, responsive to an absence of the application on the client data processing system, for sending files for the application to the client data processing system; and
    setting means for setting up the application on the client data processing system using the files, wherein the setting means includes means for updating a registry in the client data processing system to include information required to run the application on the client data processing system.

12. The data processing system of claim 11, wherein the setting means further includes including an indication in the registry that the application is setup to run on the client data processing system.

13. The data processing system of claim 11, wherein the registry includes system specific information that is specific to the client data processing system.

14. The data processing system of claim 11, wherein the user is detected at the data processing system when the user logs onto to the network.

15. The data processing system of claim 11, wherein the client data processing system is a workstation.

16. The data processing system of claim 11, wherein the client data processing system is a personal digital assistant.

17. The data processing system of claim 11, wherein the setting means is performed by running a batch file located on the server data processing system.

18. The data processing system of claim of claim 11, wherein the client data processing system includes a registry and wherein the determining means comprises means for determining whether a key is present in the registry indicating that the client data processing system is setup to run the application.

19. A data processing system for distributing applications, the data processing system comprising:
    detecting means for detecting a user at a client;
    identifying means for identifying a plurality of applications assigned to the user;
    determining means for determining whether the plurality of applications are installed on the client in response to identifying the application assigned to the user, wherein the client includes a data structure used by the plurality of applications to run on the client; and
    sending means, responsive to an absence of a determination that an application within the plurality of applications is accessible by the user on the client, for sending files and updating the data structure on the client to enable the user to access the application on the client wherein the data structure is a registry of the client, and wherein updating the data structure includes adding information required to run the application on the client.

20. The data processing system of claim 19, wherein the sending means is performed by a batch file located on a server.

21. A computer program product in a computer readable medium for distributing applications, the computer program product comprising:

first instructions for detecting a user at a client data processing system;

second instructions for identifying an application assigned to the user;

third instructions for determining whether the application is setup on the client data processing system in response to identifying the application assigned to the user;

fourth instructions, responsive to an absence of the application on the client data processing system, for sending files for the application to the client data processing system; and fifth instructions for setting up the application on the client data processing system using the files wherein the fifth instructions include instructions for updating a registry in the client data processing system to include information required to run the application on the client data processing system.

22. A computer program product in a computer readable medium for distributing applications, the computer program product comprising:

first instructions for detecting a user at a client;

second instructions for identifying a plurality of applications assigned to the user;

third instructions for determining whether the plurality of applications are installed on the client in response to identifying the application assigned to the user, wherein the client includes a data structure used by the plurality of applications to run on the client; and fourth instructions, responsive to an absence of a determination that an application within the plurality of applications is accessible by the user on the client, for sending files and updating the data structure on the client to enable the user to access the application on the client wherein the data structure is a registry of the client, and wherein the fourth instructions for updating the data structure include instructions for adding information required to run the application on the client.

23. A server data processing system for distributing applications, the server data processing system comprising:

a bus system;

a communications unit connected to the bus system;

a memory connected to the bus system, wherein the memory includes a set of instructions; and a processing unit connected to the bus system, wherein the processing unit executes the set of instructions to detect a user at a client data processing system; identify an application accessible by the user; determine whether the application is setup on the client data processing system; send files for the application to the client data processing system in response to an absence of the application on the client data processing system; and set up the application on the client data processing system wherein the setup of the application on the client data processing system includes updating a registry in the client data processing system to include information required to run the application on the client data processing system.

24. A data processing system for distributing applications, the data processing system comprising:

a bus system;

a communications unit connected to the bus system;

a memory connected to the bus system, wherein the memory includes a set of instructions; and a processing unit connected to the bus system, wherein the processing unit executes the set of instructions to detect a user at a client; identify a plurality of applications accessible by the user; determine whether the plurality of applications are installed on the client in which the client includes a data structure used by the plurality of applications to run on the client; and send files and update the data structure on the client to enable the user to access the application on the client in response to an absence of a determination that an application within the plurality of applications is accessible by the user on the client wherein the data structure is a registry of the client and wherein updating the data structure includes adding information required to run the application on the client.

25. A method in a data processing system for managing applications in a client to the data processing system, the method comprising:

identifying applications assigned to a user at the client;

determining whether all of the applications assigned to the user are present on the client in response to identifying the application assigned to the user, responsive to an application assigned to a user being absent on the client, updating the client to include the application wherein updating the client to include the application includes updating a registry in the client data processing system to include information required to run the application on the client data processing system.

26. The method of claim 25, wherein applications assigned to a user on the client are identified using a profile associated with the user.

27. The method of claim 25, wherein the updating step comprises:

running a batch file to install the application on the client.

* * * * *

UNITED STATES PATENT AND TRADEMARK OFFICE
CERTIFICATE OF CORRECTION

PATENT NO.        : 6,917,958 B1  
APPLICATION NO.  : 09/299936  
DATED            : July 12, 2005  
INVENTOR(S)      : Howe et al.

Page 1 of 1

It is certified that error appears in the above-identified patent and that said Letters Patent is hereby corrected as shown below:

Col. 10, line 43: after "Fig. 10" delete "and" and insert --an--.

Col. 11, lines 6-7: after "boxes)." insert --Filename.reg" or--

Signed and Sealed this

Nineteenth Day of December, 2006

JON W. DUDAS  
*Director of the United States Patent and Trademark Office*